G. B. CHILD.
ADJUSTABLE BROILING GRID.
APPLICATION FILED NOV. 11, 1919.

1,337,043.

Patented Apr. 13, 1920.
2 SHEETS—SHEET 1.

Inventor
G. B. Child,
By A. S. Pattison,
Attorney

G. B. CHILD.
ADJUSTABLE BROILING GRID.
APPLICATION FILED NOV. 11, 1919.
1,337,043.
Patented Apr. 13, 1920.
2 SHEETS—SHEET 2.
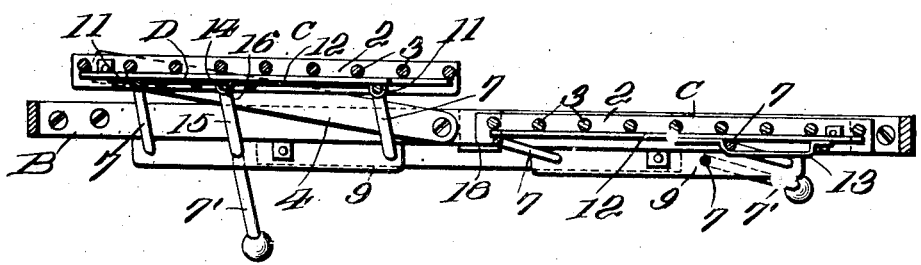
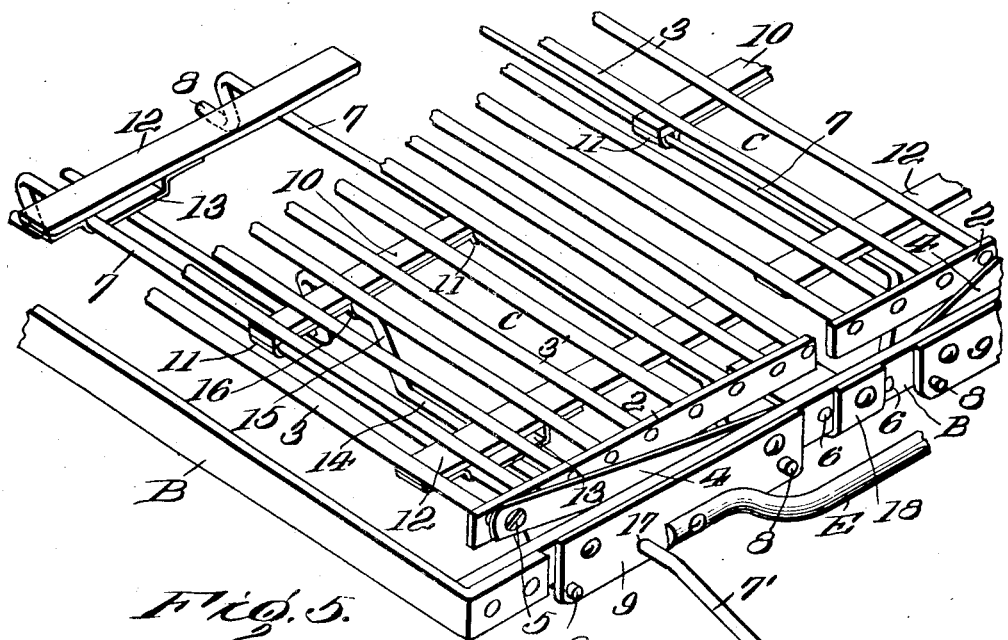
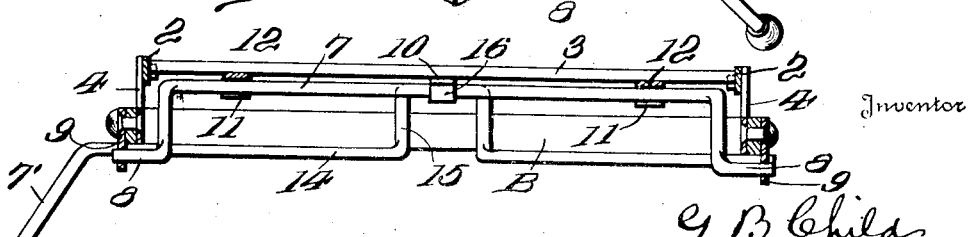

UNITED STATES PATENT OFFICE.

GUY B. CHILD, OF CHICAGO, ILLINOIS, ASSIGNOR TO AMERICAN STOVE COMPANY, OF ST. LOUIS, MISSOURI, A CORPORATION OF NEW JERSEY.

ADJUSTABLE BROILING-GRID.

1,337,043.  Specification of Letters Patent.  Patented Apr. 13, 1920.

Application filed November 11, 1919. Serial No. 337,343.

*To all whom it may concern:*

Be it known that I, GUY B. CHILD, a citizen of the United States, residing at Chicago, in the county of Cook and State of Illinois, have invented certain new and useful Improvements in Adjustable Broiling-Grids, of which the following is a specification, reference being had therein to the accompanying drawing.

This invention relates to improvements in adjustable broiling grids, and the primary object of which is to provide a broiling grid in which the grid section, or sections are capable of having two levels in respect to the burner without raising the entire grid frame.

Another object of my present invention is to provide the grid with two grid sections vertically movable independent of each other, whereby one grid section may be raised above the other, thus enabling one grid section to be used for broiling thick steak and the other to broil bacon or thin toast, or both grid sections may be raised and the entire grid surface thus brought near the flame, or both grid sections can be dropped farther away from the flame according to the character of the article being broiled.

A further object of my invention is the provision of means for independently moving the grid sections up and down in respect to the burner flame.

A further object of my invention pertains to the improved specific manner of pivotally supporting the grid sections in the grid frame, whereby they are moved vertically within the grid frame, while maintained in a horizontal position as they are moved up and down, and when in either their raised or lowered positions.

In the accompanying drawings—

Fig. 3 is a vertical sectional view taken on the line 3—3 of Fig. 2.

Fig. 4 is a perspective view showing the operating parts of one of the grid sections.

Fig. 5 is a transverse sectional view taken on the line 5—5 of Fig. 2.

Figures 1, 2:
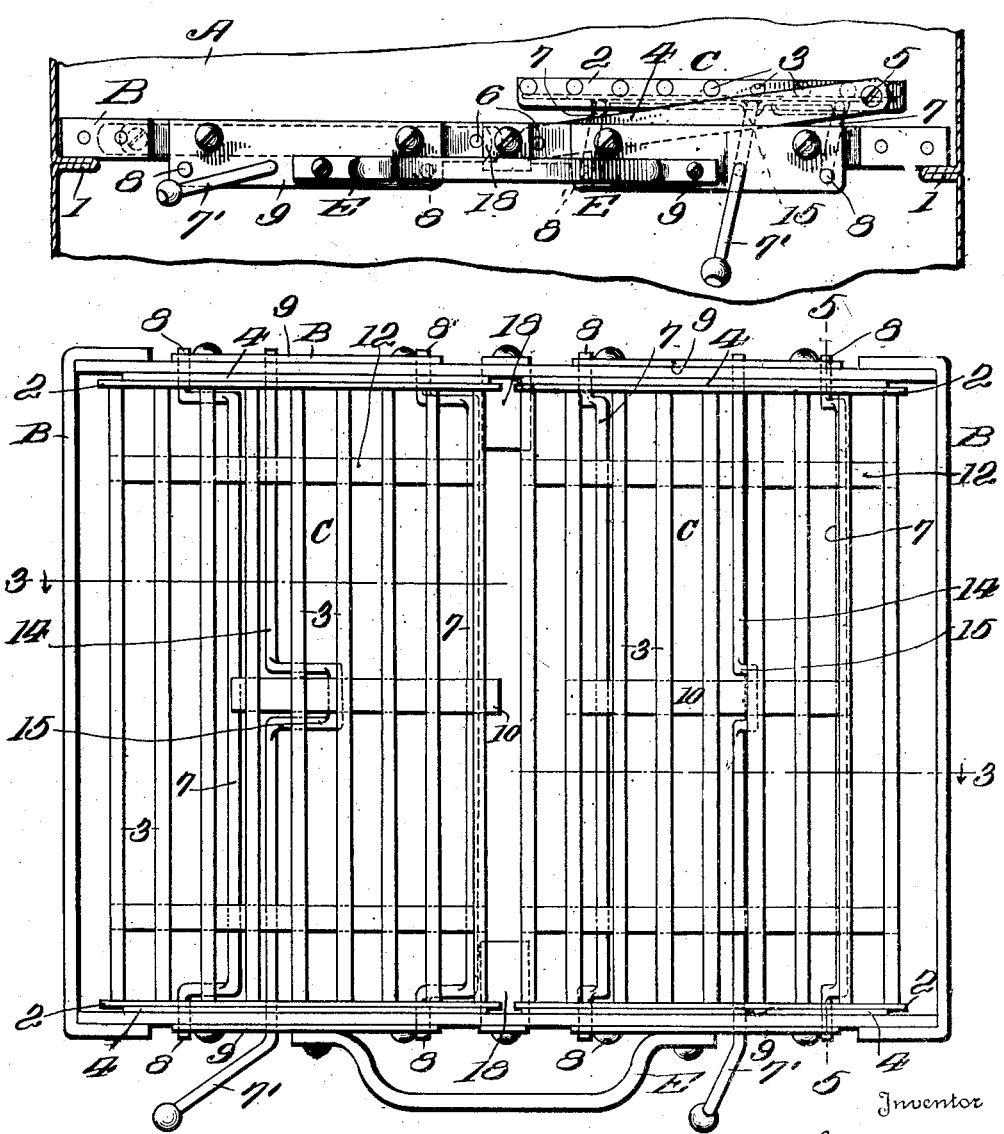
Figure 1 is an edge elevation of a broiling grid embodying my invention, it being shown on supporting ledges of an oven, and one grid section raised and the other lowered.
Fig. 2 is a top plan view of my improved broiling grid.

Referring now to the drawings, A indicates a part of an oven wall which is provided with the usual plurality of horizontally supporting flanges of which one flange is shown at 1.

My improved broiling grid comprises a rectangular grid frame B, in which are supported two grid sections C, both of which are vertically movable in respect to the grid frame B and capable of having two broiling levels, one above the other, for the purpose of positioning the grid sections near to or farther from the burner flame, not shown, according to the requirements of the food being broiled, so far as its nearness to the burner flame is concerned. These grid sections C are movable to their upper or lower levels independently of the grid frame and without the necessity of lifting the complete broiling grid.

It is well-known that the usual broiling grid is positioned near to or far from the burner flame by lifting the entire broiling grid and placing it upon the desired supporting flange 1, for the purpose of placing the grid in the desired position in respect to the burner flame. By means of my improved broiler grid, the object being broiled is capable of being maintained in an upper or lower position, or level, in respect to the burner flame without disturbing the grid proper.

In carrying out my present improvement, the two grid sections C, consist of side bars 2, which are connected by transverse wires or bars 3, thus forming the grid sections C. These grid sections C are made sufficiently shorter than the space within the grid frame B to accommodate section guiding links 4, located between the ends of the grid sections C, and the inner side of the front and rear ends of the grid frame B. The outer ends of the links 4 are pivoted to the outer ends of the grid sections C, at the points 5, and the inner ends of the links 4 are pivoted to the inner sides of the ends of the grid frame B, at the points 6. From this construction it will be observed that the grid sections C may be moved vertically in respect to the grid frame B, through the medium of the pivoted links 4, and maintained in their proper relative positions within the grid frame.

These grid sections may be raised to a level above the grid frame B, or lowered within and to a level corresponding to the upper edge of the grid frame B. This vertical movement of the grid sections C is accomplished by the following mechanism:

Located below the rear grid section and adapted to raise it and support it in its elevated position is a lifting frame D. This lifting frame consists of two U-shaped members 7 for each grid section. The ends 8 of these U-shaped members 7 are pivotally supported in depending flanges 9, of the main grid frame B. A horizontal bar 10 has its ends provided with bearings 11, through which the U-shaped members 7 pass. Secured to the inner side of the bars 3 of the grid sections C, are flat bars 12, and these flat bars are provided at their outer ends with independent elongated loops 13, through which the adjacent U-shaped bars 7 pass and move back and forth therein as the grid section is raised and lowered. An operating member 14 is provided for each grid section. This operating member 14 has a laterally extending U-shaped portion 15, which passes through a bearing 16, depending from the bar 10 of each grid section C. The ends of the operating members 14 pass through the flanges 9, and are pivoted therein, the forward or outer end of the operating members 14 being provided with a laterally extending operating handle 17′.

By means of this construction, the operating handle 17′ is near a horizontal position when its grid section is lowered, as shown in Figs. 1 and 3, and is near a vertical position when the grid sections are elevated. When the grid section is in an elevated position, the operating member 14 is moved slightly beyond its vertical center, as shown clearly in Fig. 3, and the movement in this direction is limited by the outer U-shaped member 7 of its grid section reaching the outer end of its loop 13. By reason of the U-shaped member 7 being slightly beyond its vertical center, as shown at the left hand side of Fig. 3, and limited in this movement by the elongated loops 13, its grid section is prevented from moving downward by a weight or pressure thereon, as will be readily understood. By the movement of the operating handle to the opposite position shown at the right-hand side of Fig. 3, its grid section is lowered.

The grid sections C are limited as to their movement by suitable stops 18, which project inward from the main frame B, under the inner ends of the sections C, when in their lowered positions.

By means of the foregoing construction one of the grid sections C is capable of being raised to a level higher than that of the other grid section, thus making a grid in which either half of its surface is movable above and nearer to the burner flame than the other half, whereby one kind of food may be broiled on the upper half near the flame, while simultaneously other food may be broiled on the other half at a point farther away from the burner flame, or the whole grid surface may be raised to the upper level or lowered to the lower level, according to the requirements of the food to be broiled.

Having thus described my invention what I claim and desire to secure by Letters Patent is:—

1. A broiling grid comprising a main frame, independent grid sections arranged end to end and independently vertically movably mounted within the main frame, and means for independently lifting and lowering the grid sections in respect to the main frame, whereby food may be simultaneously broiled upon the grid sections at different elevations in respect to a burner flame.

2. A broiling grid comprising a main frame, a broiling surface made up of two independently movable grid sections, pivotally mounted within the main frame end to end, and independently movable up and down therein, and means for independently raising and lowering the two grid sections and simultaneously maintaining them at the same or different elevations in respect to a burner flame.

3. A broiling grid comprising a main frame, a grid section within the main frame, links pivotally connecting the grid section to the main frame, and means independent of the links for raising and lowering the grid frame on its pivoted link connection.

4. A broiling grid comprising a main frame, a grid section within the main frame, links at each end of the grid section and having their corresponding ends respectively pivoted to the grid section and the main frame, means for moving the grid section up and down on its pivoted link connections with the main frame, and means independent of the links for maintaining the grid in its elevated position.

5. A broiling grid comprising a main frame, a grid section vertically movable in respect to the main frame, U-shaped pivoted members with their ends pivoted in the main frame and intermediately pivoted to the grid section, links having their ends respectively pivoted to the grid section and the main frame, and a lever operatively connected to move the grid section up and down on its pivotal supports for the purpose described.

6. A broiling grid comprising a main frame, a grid section vertically movable in respect thereto, U-shaped grid supporting members having their ends pivoted in the main frame and intermediately pivoted to the grid section, the grid section having an elongated loop in which one of the pivoted members swings to limit its movement for the purpose described, links having their ends respectively pivoted to the main frame and an operating member adapted to move the grid up and down in respect to the main frame.

In testimony whereof I hereunto affix my signature.

GUY B. CHILD.